(12) United States Patent
Zhang et al.

(10) Patent No.: US 11,604,473 B2
(45) Date of Patent: Mar. 14, 2023

(54) DYNAMIC VELOCITY PLANNING METHOD FOR AUTONOMOUS VEHICLE AND SYSTEM THEREOF

(71) Applicant: Automotive Research & Testing Center, Changhua County (TW)

(72) Inventors: Zhi-Hao Zhang, Changhua County (TW); Tsung-Ming Hsu, Changhua County (TW); Bo-Han Lin, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 192 days.

(21) Appl. No.: 17/105,621

(22) Filed: Nov. 26, 2020

(65) Prior Publication Data
US 2022/0163973 A1    May 26, 2022

(51) Int. Cl.
*G05D 1/02*    (2020.01)
*B60W 50/00*   (2006.01)

(52) U.S. Cl.
CPC ....... *G05D 1/0223* (2013.01); *B60W 50/0098* (2013.01); *B60W 2050/0028* (2013.01); *B60W 2520/10* (2013.01); *B60W 2520/105* (2013.01); *B60W 2520/12* (2013.01); *B60W 2520/125* (2013.01); *B60W 2520/18* (2013.01); *B60W 2530/10* (2013.01); *B60W 2530/201* (2020.02); *B60W 2554/00* (2020.02); *G05D 2201/0213* (2013.01)

(58) Field of Classification Search
CPC ........ G05D 1/0223; G05D 2201/0213; B60W 50/0098; B60W 2554/00; B60W 2530/201; B60W 2050/0028; B60W 2520/10; B60W 2520/105; B60W 2520/12; B60W 2520/125; B60W 2520/18; B60W 2530/10
See application file for complete search history.

(56) References Cited

U.S. PATENT DOCUMENTS 5,805,449 A * 9/1998 Ito ................... B60W 30/18145
                                                         180/443
9,857,795 B2 * 1/2018 Gupta ................. B60W 30/20

* cited by examiner

*Primary Examiner* — Nicholas Kiswanto
*Assistant Examiner* — Jamal A Shah
(74) *Attorney, Agent, or Firm* — CKC & Partners Co., LLC

(57) ABSTRACT

A dynamic velocity planning method for an autonomous vehicle is performed to plan a best velocity curve of the autonomous vehicle. An information storing step is performed to store an obstacle information, a road information and a vehicle information. An acceleration limit calculating step is performed to calculate the vehicle information according to a calculating procedure to generate an acceleration limit value range. An acceleration combination generating step is performed to generate a plurality of acceleration combinations according to the obstacle information, the road information, and the acceleration limit value range. An acceleration filtering step is performed to filter the acceleration combinations according to a jerk threshold and a jerk switching frequency threshold to obtain a selected acceleration combination. An acceleration smoothing step is performed to execute a driving behavior procedure to adjust the selected acceleration combination to generate the best velocity curve.

12 Claims, 12 Drawing Sheets

DYNAMIC VELOCITY PLANNING METHOD FOR AUTONOMOUS VEHICLE AND SYSTEM THEREOF

BACKGROUND

Technical Field

The present disclosure relates to a dynamic velocity planning method for an autonomous vehicle and a system thereof. More particularly, the present disclosure relates to a dynamic velocity planning method for an autonomous vehicle with a human driving behavior and a system thereof.

Description of Related Art

As autonomous vehicles become more prominent, many car manufacturers have invested in the development of autonomous vehicles, and several governments plan on operating mass transit systems using autonomous vehicles. In some countries, experimental autonomous vehicles have been approved.

Advanced Driver Assistance System (ADAS) and Autonomous Driving System (ADS) of the current autonomous vehicles lack adaptability to the external environment. For example, the velocity control of ADAS is mainly based on Autonomous Cruise Control (ACC), but ACC lacks a planning of velocity or acceleration and cannot predict the future interaction with other vehicles. In addition, although ADS has the planning of velocity and only considers the vehicle operating limits, but ADS do not consider acceleration and jerk limits of the vehicle dynamic.

It can be seen that the current ADAS and ADS on the market lack the ability to plan and respond to acceleration. How to develop a dynamic velocity planning method and a system based on the vehicle dynamic and the external environment is highly anticipated by the public and becomes the goal of relevant industry efforts.

SUMMARY

According to one aspect of the present disclosure, a dynamic velocity planning method for an autonomous vehicle is performed to plan a best velocity curve of the autonomous vehicle. The dynamic velocity planning method for the autonomous vehicle includes performing an information storing step, an acceleration limit calculating step, an acceleration combination generating step, an acceleration filtering step and an acceleration smoothing step. The information storing step is performed to drive a memory to store an obstacle information of an obstacle, a road information and a vehicle information of the autonomous vehicle. The vehicle information includes a jerk threshold and a jerk switching frequency threshold. The acceleration limit calculating step is performed to drive a processing unit to receive the vehicle information from the memory and calculate the vehicle information according to a calculating procedure to generate an acceleration limit value range of the autonomous vehicle. In addition, the acceleration combination generating step is performed to drive the processing unit to receive the obstacle information and the road information from the memory and plan an acceleration interval of the autonomous vehicle according to the obstacle information, the road information and the acceleration limit value range, and then generate a plurality of acceleration combinations of the autonomous vehicle according to the acceleration interval. The acceleration filtering step is performed to drive the processing unit to filter the acceleration combinations according to the jerk threshold and the jerk switching frequency threshold to obtain a selected acceleration combination. The acceleration smoothing step is performed to drive the processing unit to execute a driving behavior procedure to adjust the selected acceleration combination to generate the best velocity curve.

According to another aspect of the present disclosure, a dynamic velocity planning system for an autonomous vehicle is performed to plan a best velocity curve of the autonomous vehicle. The dynamic velocity planning system for the autonomous vehicle includes a memory and a processing unit. The memory is configured to access an obstacle information of an obstacle, a road information, a vehicle information of the autonomous vehicle, a calculating procedure and a driving behavior procedure. The vehicle information includes a jerk threshold and a jerk switching frequency threshold. The processing unit is electrically connected to the memory. The processing unit is configured to implement a dynamic velocity planning method for the autonomous vehicle including performing an acceleration limit calculating step, an acceleration combination generating step, an acceleration filtering step and an acceleration smoothing step. The acceleration limit calculating step is performed to calculate the vehicle information according to the calculating procedure to generate an acceleration limit value range of the autonomous vehicle. The acceleration combination generating step is performed to plan an acceleration interval of the autonomous vehicle according to the obstacle information, the road information and the acceleration limit value range, and then generate a plurality of acceleration combinations of the autonomous vehicle according to the acceleration interval. The acceleration filtering step is performed to filter the acceleration combinations according to the jerk threshold and the jerk switching frequency threshold to obtain a selected acceleration combination. The acceleration smoothing step is performed to execute the driving behavior procedure to adjust the selected acceleration combination to generate the best velocity curve.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
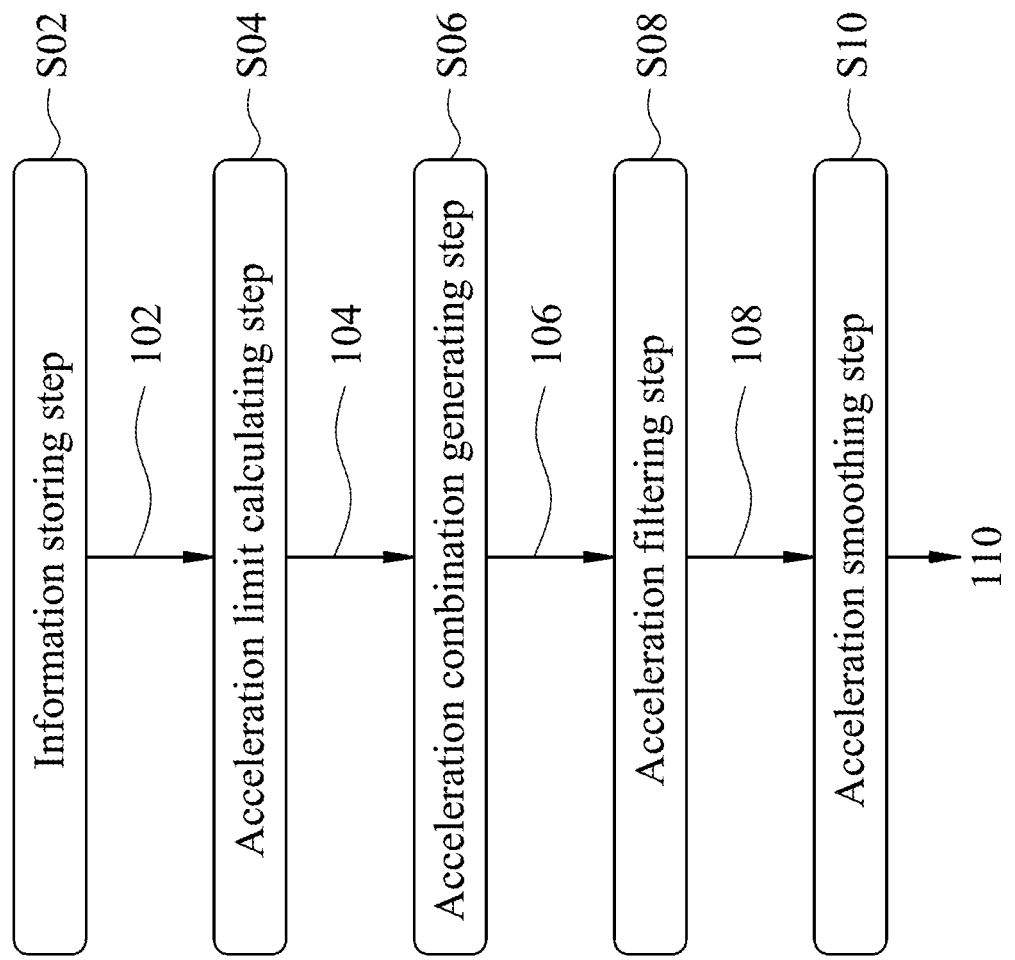
FIG. 1 shows a flow chart of a dynamic velocity planning method for an autonomous vehicle according to a first embodiment of the present disclosure.

Please refer to FIG. 1. FIG. 1 shows a flow chart of a dynamic velocity planning method 100 for an autonomous vehicle according to a first embodiment of the present disclosure. The dynamic velocity planning method 100 for the autonomous vehicle is performed to plan a best velocity curve 110 of the autonomous vehicle. The dynamic velocity planning method 100 for the autonomous vehicle includes performing an information storing step S02, an acceleration limit calculating step S04, an acceleration combination generating step S06, an acceleration filtering step S08 and an acceleration smoothing step S10.

The information storing step S02 is performed to drive a memory to store an obstacle information of an obstacle, a road information and a vehicle information 102 of the autonomous vehicle. The vehicle information 102 includes a jerk threshold and a jerk switching frequency threshold. The acceleration limit calculating step S04 is performed to drive a processing unit to receive the vehicle information 102 from the memory and calculate the vehicle information 102 according to a calculating procedure to generate an acceleration limit value range 104 of the autonomous vehicle. In addition, the acceleration combination generating step S06 is performed to drive the processing unit to receive the obstacle information and the road information from the memory and plan an acceleration interval of the autonomous vehicle according to the obstacle information, the road information and the acceleration limit value range 104, and then generate a plurality of acceleration combinations 106 of the autonomous vehicle according to the acceleration interval. The acceleration filtering step S08 is performed to drive the processing unit to filter the acceleration combinations 106 according to the jerk threshold and the jerk switching frequency threshold to obtain a selected acceleration combination 108. The acceleration smoothing step S10 is performed to drive the processing unit to execute a driving behavior procedure to adjust the selected acceleration combination 108 to generate the best velocity curve 110. Therefore, the dynamic velocity planning method 100 for the autonomous vehicle of the present disclosure obtains the acceleration limit value range 104 through the vehicle information 102 and the calculating procedure, and then plans the acceleration combinations 106 by integrating the acceleration limit value range 104 with the obstacle information and the road information, and uses the acceleration as a standard and considers vehicle operating limits, vehicle dynamics and human driving behaviors at the same time so as to adapt to changes in the environmental, so that the future behavior of the autonomous vehicle is predictable. The details of the abovementioned steps will be described below through more detailed embodiments.

Figure 2:
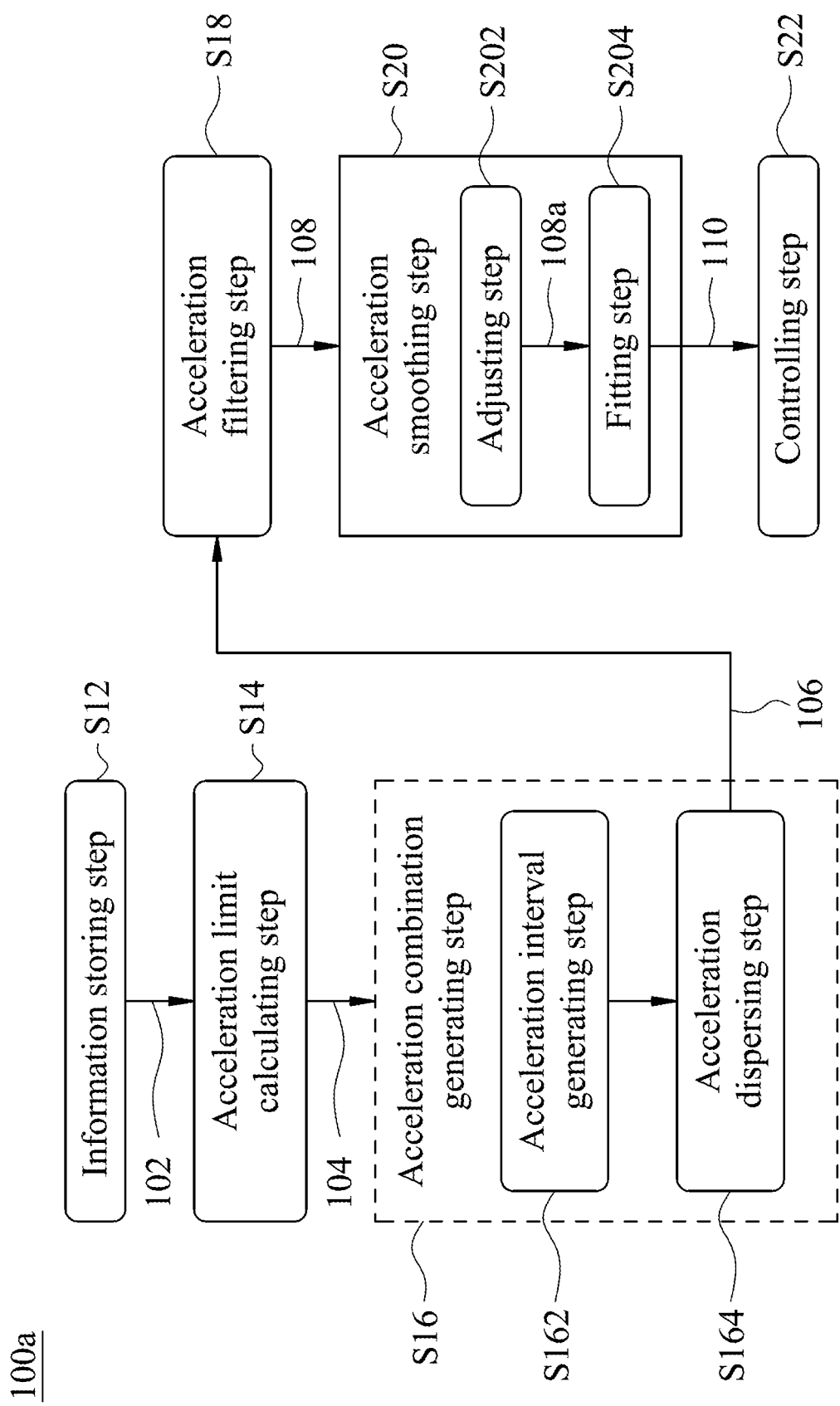
FIG. 2 shows a flow chart of a dynamic velocity planning method for an autonomous vehicle according to a second embodiment of the present disclosure.
Figure 3:
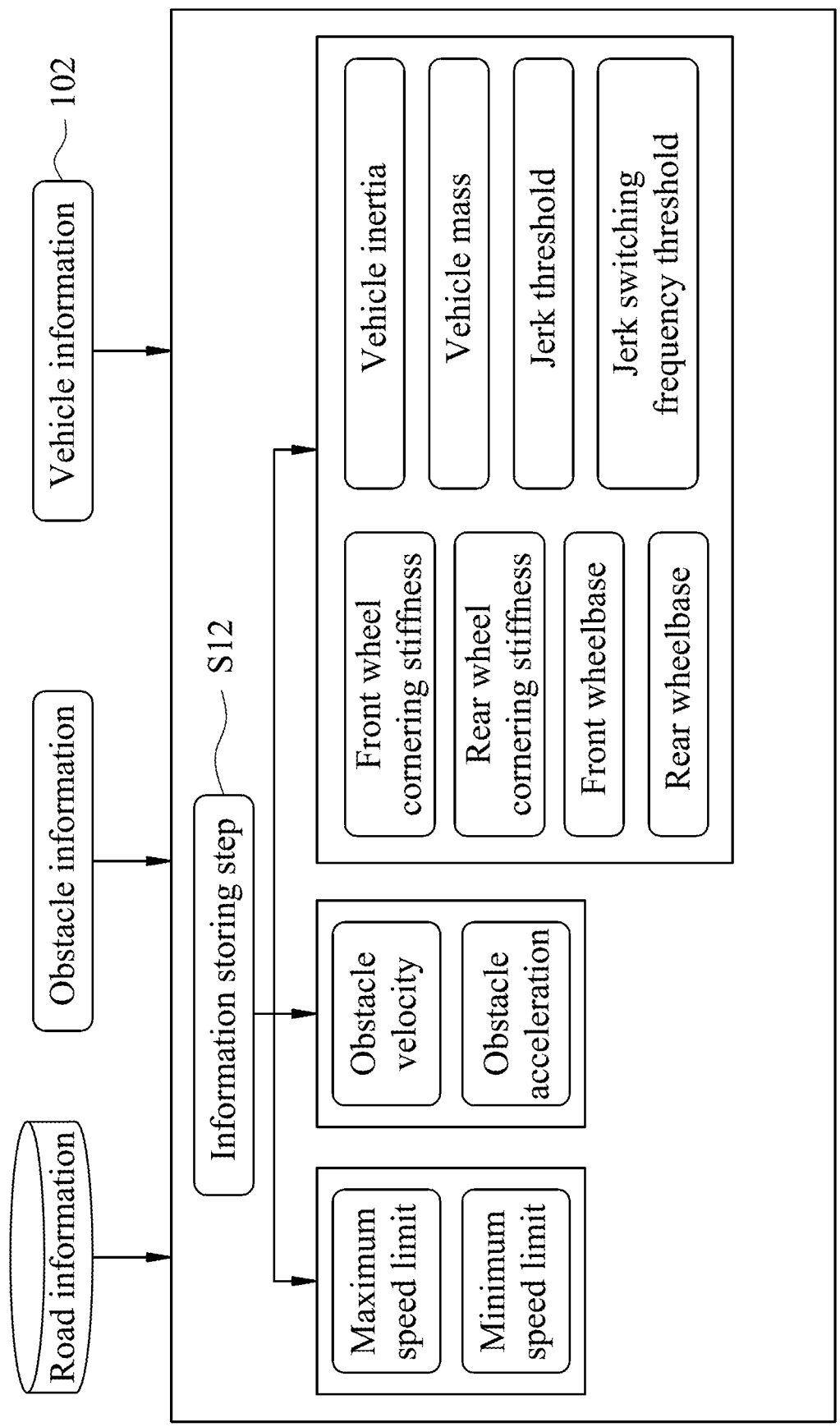
FIG. 3 shows a schematic view of an information storing step of the dynamic velocity planning method for the autonomous vehicle of FIG. 2.
Figure 4:
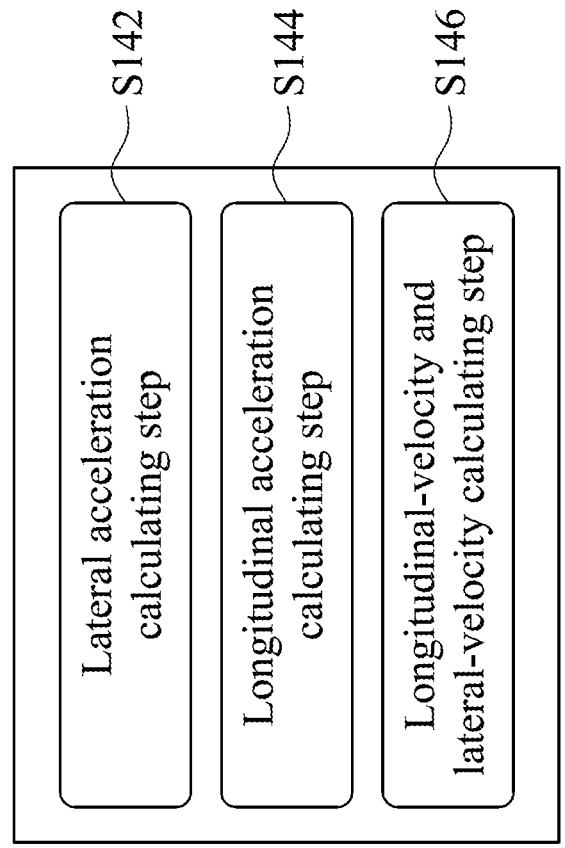
FIG. 4 shows a schematic view of an acceleration limit calculating step of the dynamic velocity planning method for the autonomous vehicle of FIG. 2.
Figure 5:
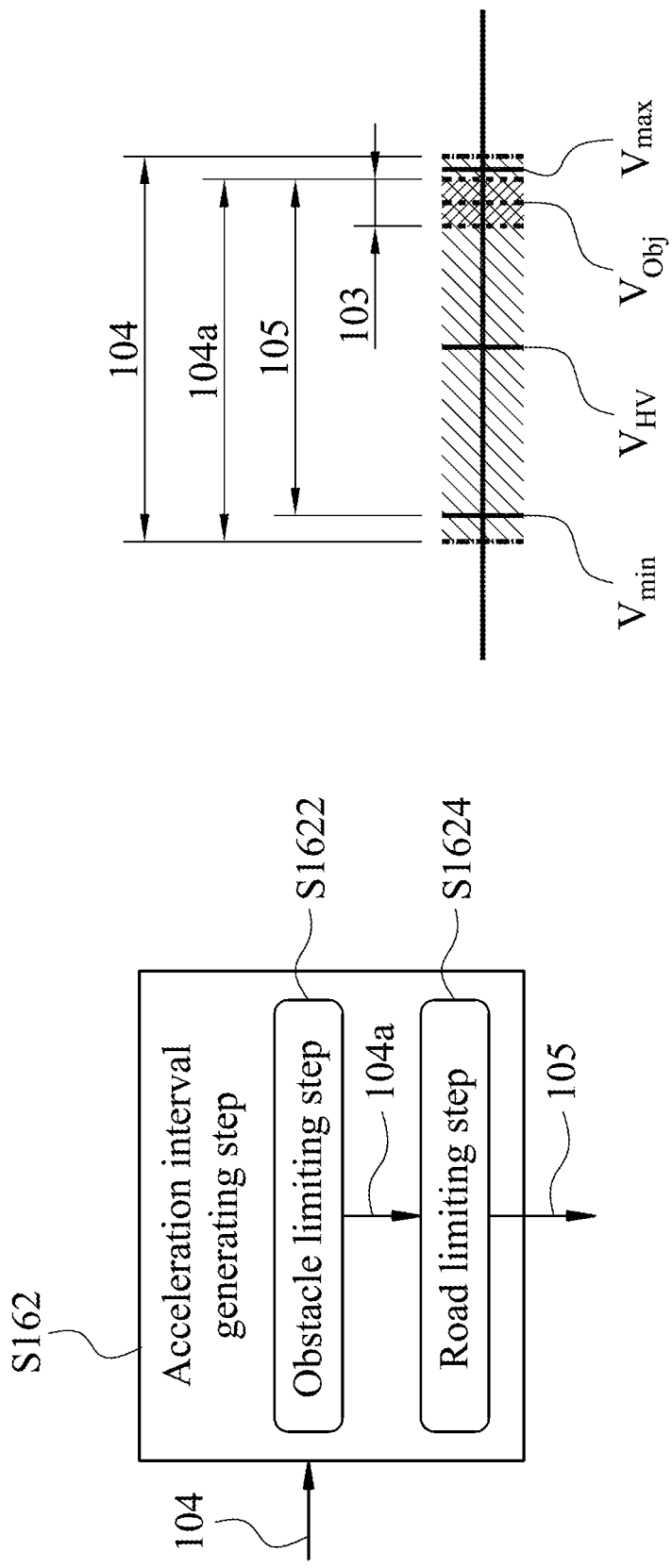
FIG. 5 shows a schematic view of an acceleration interval generating step of the dynamic velocity planning method for the autonomous vehicle of FIG. 2.
Figure 6:
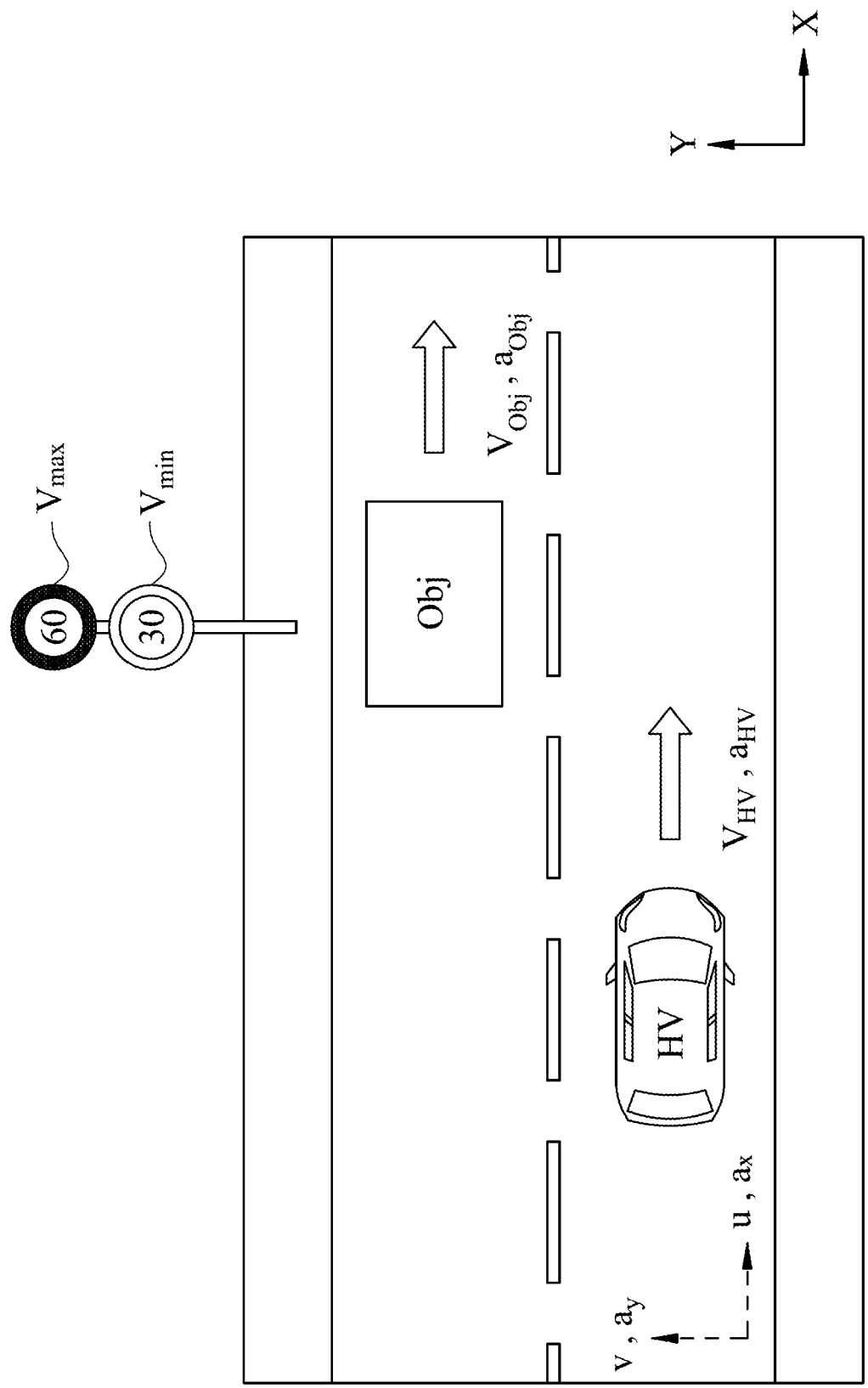
FIG. 6 shows a schematic view of the dynamic velocity planning method for the autonomous vehicle of FIG. 2, applied to an object avoidance in the same vehicle lane.
Figure 7:
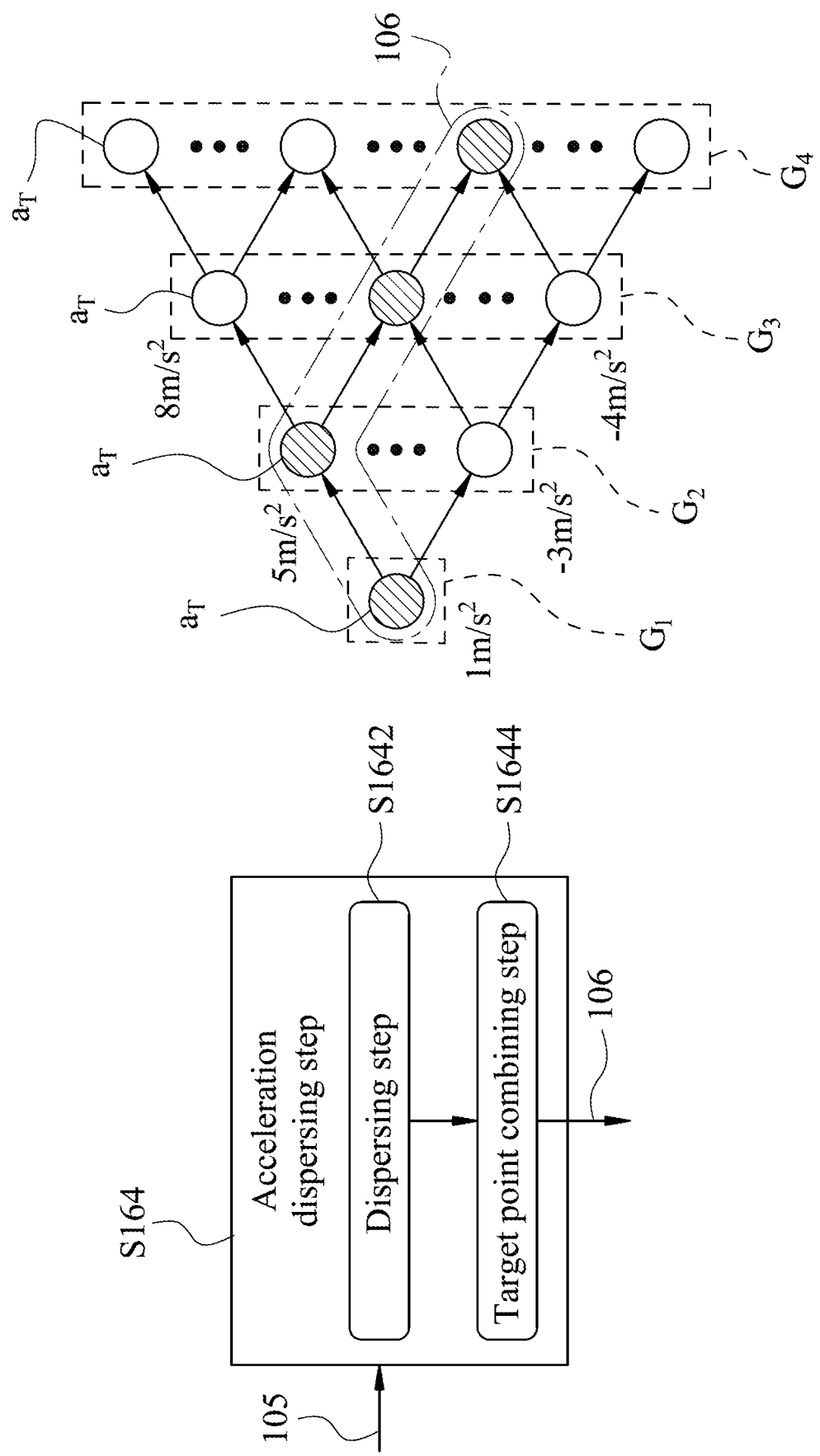
FIG. 7 shows a schematic view of an acceleration dispersing step of the dynamic velocity planning method for the autonomous vehicle of FIG. 2.
Figure 8:
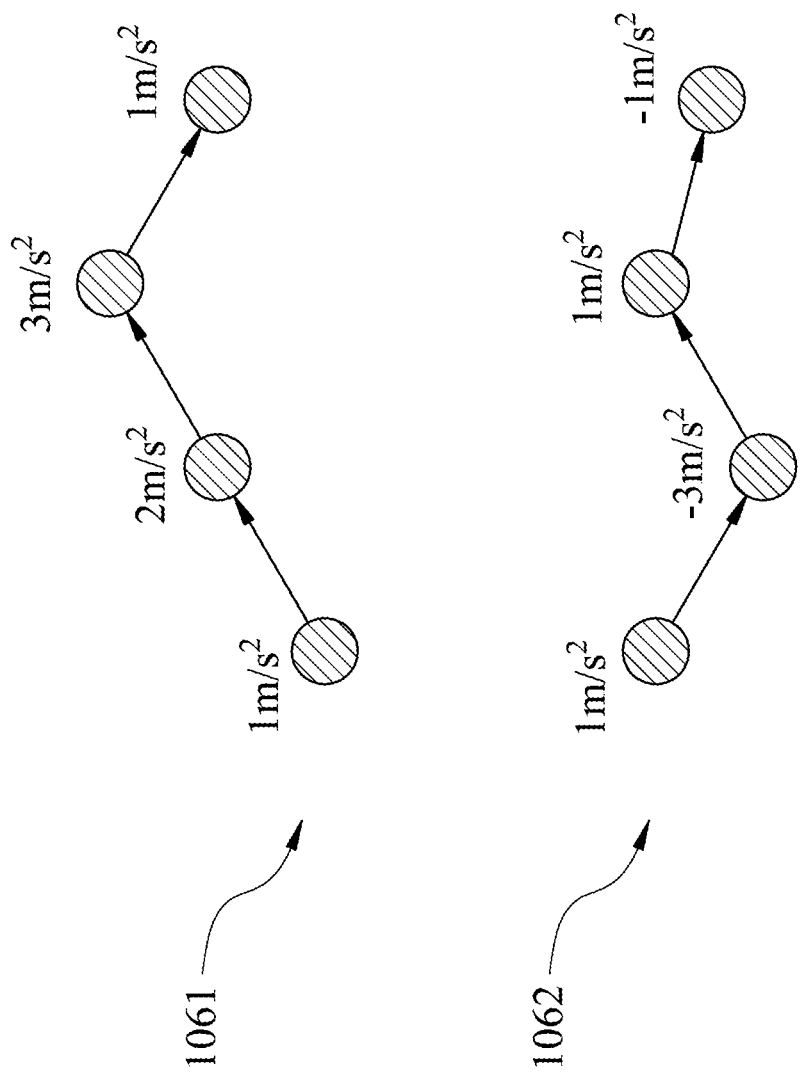
FIG. 8 shows a schematic view of an acceleration filtering step of the dynamic velocity planning method for the autonomous vehicle of FIG. 2.
Figure 9:
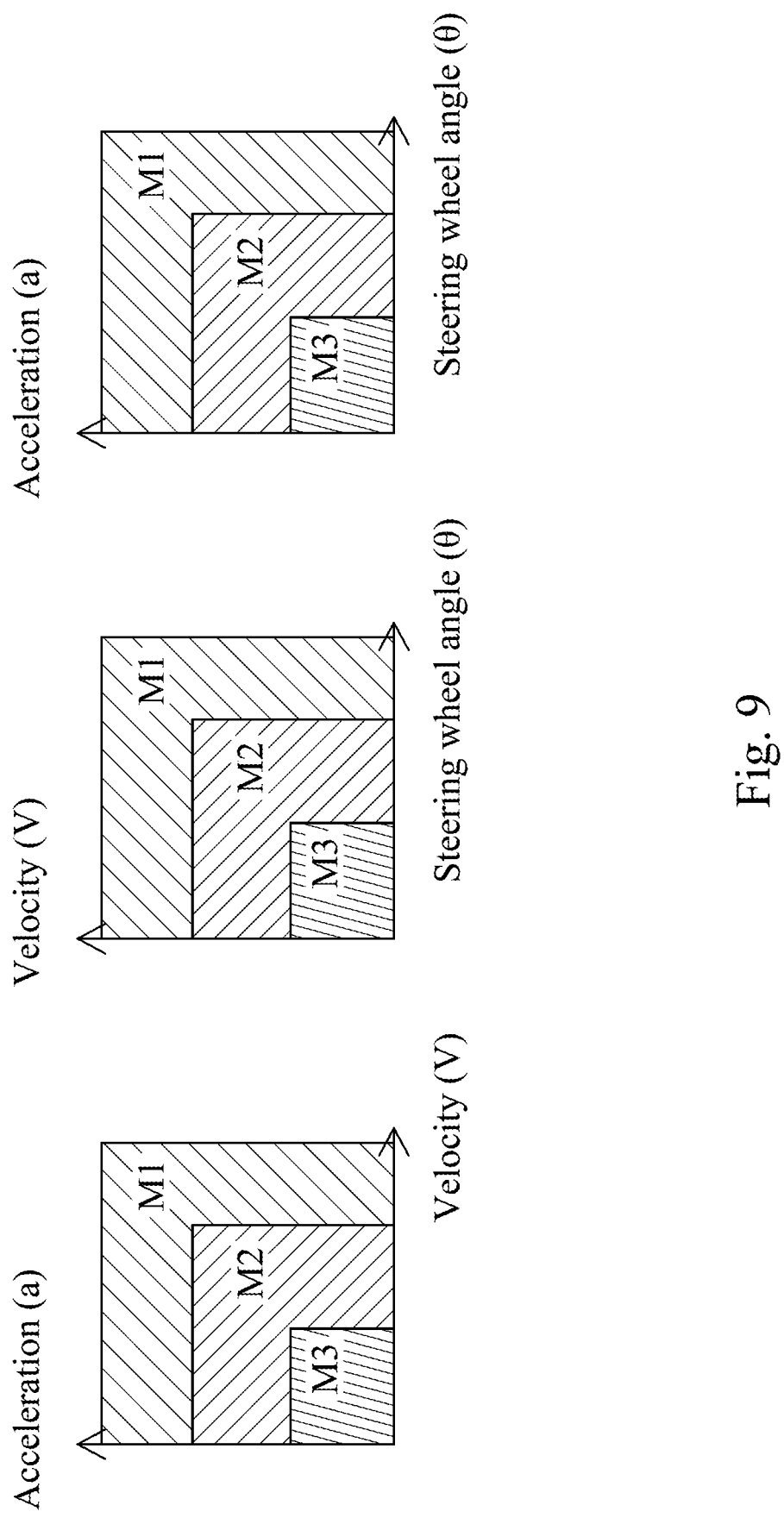
FIG. 9 shows a schematic view of a progressive model, a normal model and a conservative model of the dynamic velocity planning method for the autonomous vehicle of FIG. 2.
Figure 10:
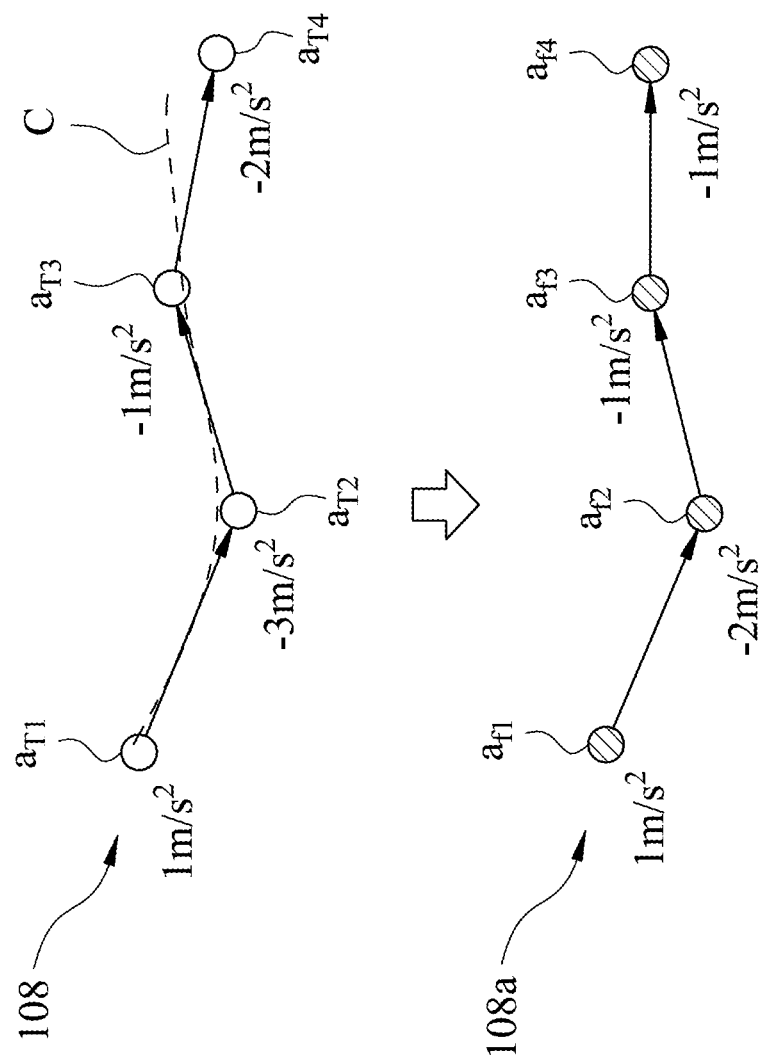
FIG. 10 shows a schematic view of an adjusting step of the dynamic velocity planning method for the autonomous vehicle of FIG. 2.
Figure 11:
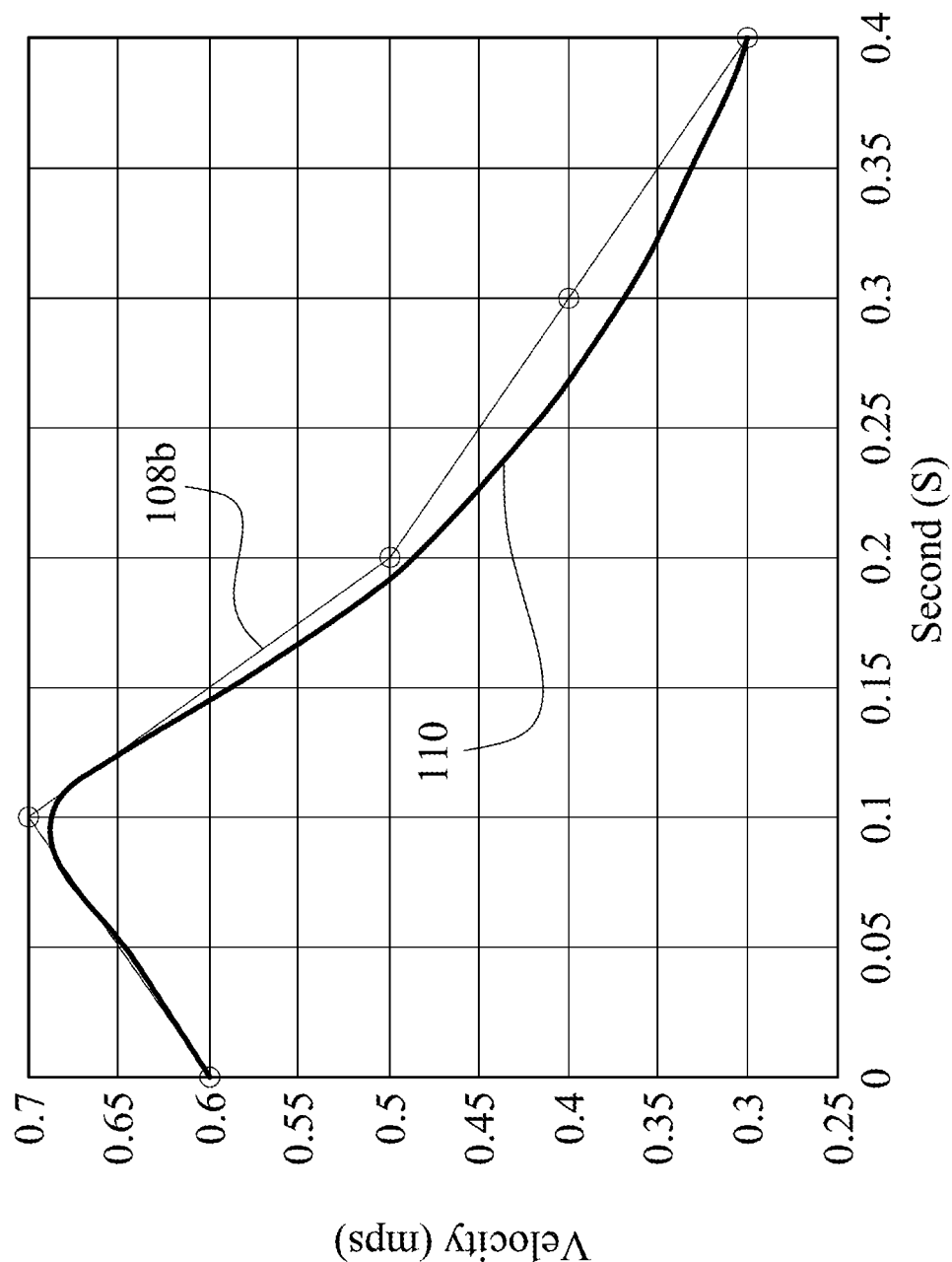
FIG. 11 shows a schematic view of a fitting step of the dynamic velocity planning method for the autonomous vehicle of FIG. 2.

Please refer to FIGS. 2 to 11. FIG. 2 shows a flow chart of a dynamic velocity planning method 100a for an autonomous vehicle HV according to a second embodiment of the present disclosure. FIG. 3 shows a schematic view of an information storing step S12 of the dynamic velocity planning method 100a for the autonomous vehicle HV of FIG. 2. FIG. 4 shows a schematic view of an acceleration limit calculating step S14 of the dynamic velocity planning method 100a for the autonomous vehicle HV of FIG. 2. FIG. 5 shows a schematic view of an acceleration interval generating step S162 of the dynamic velocity planning method 100a for the autonomous vehicle HV of FIG. 2. FIG. 6 shows a schematic view of the dynamic velocity planning method 100a for the autonomous vehicle HV of FIG. 2, applied to an object avoidance in the same vehicle lane. FIG. 7 shows a schematic view of an acceleration dispersing step S164 of the dynamic velocity planning method 100a for the autonomous vehicle HV of FIG. 2. FIG. 8 shows a schematic view of an acceleration filtering step S18 of the dynamic velocity planning method 100a for the autonomous vehicle HV of FIG. 2. FIG. 9 shows a schematic view of a progressive model M1, a normal model M2 and a conservative model M3 of the dynamic velocity planning method 100a for the autonomous vehicle HV of FIG. 2. FIG. 10 shows a schematic view of an adjusting step S202 of the dynamic velocity planning method 100a for the autonomous vehicle HV of FIG. 2. FIG. 11 shows a schematic view of a fitting step S204 of the dynamic velocity planning method 100a for the autonomous vehicle HV of FIG. 2. In FIGS. 2 to 11, the dynamic velocity planning method 100a for the autonomous vehicle HV is performed to plan a best velocity curve 110 of the autonomous vehicle HV. The dynamic velocity planning method 100a for the autonomous vehicle HV includes performing an information storing step S12, an acceleration limit calculating step S14, an acceleration combination generating step S16, an acceleration filtering step S18, an acceleration smoothing step S20 and a controlling step S22.

The information storing step S12 is performed to drive a memory to store an obstacle information of an obstacle Obj, a road information and a vehicle information 102 of the autonomous vehicle HV. In detail, the autonomous vehicle HV includes a sensing module which is configured to sense the obstacle information, the road information and the vehicle information 102 and stores the obstacle information, the road information and the vehicle information 102 to the memory. The obstacle information includes an obstacle velocity $V_{obj}$, an obstacle acceleration $a_{Obj}$ and an obstacle acceleration range 103 of the obstacle Obj. The road information includes a maximum speed limit $V_{max}$ and a minimum speed limit $V_{min}$. The vehicle information 102 includes a jerk threshold, a jerk switching frequency threshold, a front wheel cornering stiffness, a rear wheel cornering stiffness, a front wheelbase, a rear wheelbase, a vehicle inertia and a vehicle mass.

The acceleration limit calculating step S14 is performed to drive a processing unit to receive the vehicle information 102 from the memory and calculate the vehicle information 102 according to a calculating procedure to generate an acceleration limit value range 104 of the autonomous vehicle HV. In detail, the acceleration limit calculating step S14 includes performing a lateral acceleration calculating step S142, a longitudinal acceleration calculating step S144 and a longitudinal-velocity and lateral-velocity calculating step S146. The lateral acceleration calculating step S142 is performed to drive the processing unit to calculate the vehicle information 102 according to a dynamics calculating model to generate a lateral acceleration $a_y$ of the autonomous vehicle HV. The longitudinal acceleration calculating step S144 is performed to drive the processing unit to calculate the lateral acceleration $a_y$ according to a friction circle calculating model to generate a longitudinal acceleration $a_x$ of the autonomous vehicle HV. The longitudinal-velocity and lateral-velocity calculating step S146 is performed to drive the processing unit to calculate the lateral acceleration $a_y$ and the longitudinal acceleration $a_x$ according to a kinematics calculating model to generate a lateral velocity v and a longitudinal velocity u of the autonomous vehicle HV, respectively.

More detail, the calculating procedure includes the dynamics calculating model, the friction circle calculating model and the kinematics calculating model. First, the dynamics calculating model includes a lateral force $F_y$, the vehicle mass m, an acceleration $\dot{v}$, the longitudinal velocity u, a yaw rate r, a yaw angular acceleration $\dot{r}$, a front wheel lateral force $F_{yf}$, a rear wheel lateral force $F_{yr}$ and the vehicle inertia $I_z$ and conforms to the following equation (1):

$$\begin{cases} F_y = m(\dot{v} + ur) = F_{yf} + F_{yr} \\ I_z \cdot \dot{r} = F_{yf} + F_{yr} \end{cases} \quad (1)$$

The processing unit substitutes the front wheel cornering stiffness $C_{af}$, the rear wheel cornering stiffness $C_{ar}$, the front wheelbase a, the rear wheelbase b, the vehicle inertia $I_z$ and the vehicle mass m of the vehicle information 102 into the equation (1) and derives the following equation (2) according to the dynamics calculating model:

$$\frac{d}{dt}\begin{bmatrix} v \\ r \end{bmatrix} = \begin{bmatrix} -\frac{(C_{af}+C_{ar})}{mu} & \frac{bC_{ar}-aC_{ar}}{mu}-u \\ \frac{bC_{ar}-aC_{ar}}{I_z u} & -\frac{(a^2 C_{af}+b^2 C_{ar})}{I_z u} \end{bmatrix}\begin{bmatrix} v \\ r \end{bmatrix} + \begin{bmatrix} \frac{C_{af}}{m} \\ \frac{aC_{af}}{I_z} \end{bmatrix}\delta_f. \quad (2)$$

v is the lateral velocity, $\delta_f$ is a front wheel angle, and t is a time. The processing unit performs a matrix multiplication and an expansion on the equation (2), and the lateral acceleration $a_y$ which conforms to the following equation (3) can be obtained after arranging:

$$\begin{aligned}\frac{dv}{dt} &= \left(-\frac{(C_{af}+C_{ar})}{mu}\right)v + \left(\frac{bC_{ar}-aC_{ar}}{mu}-u_0\right)r + \left(\frac{C_{af}}{m}\right)\delta_f \\ &= \frac{C_{af}}{m}\left(\delta_f - \frac{v-ar}{u}\right) + \frac{C_{ar}}{m}\left(-\frac{v-br}{u}\right) - ur = a_y.\end{aligned} \quad (3)$$

Next, the friction circle calculating model includes a maximum available longitudinal force $F_{x,max}$, a longitudinal force $F_x$, a maximum available lateral force $F_{y,max}$, the lateral force $F_y$, a maximum longitudinal acceleration $a_{x,max}$, a maximum lateral acceleration $a_{y,max}$, the longitudinal acceleration $a_x$ and the lateral acceleration $a_y$, and conforms to the following equation (4). The processing unit shifts and eliminates the equation (4) to generate the longitudinal acceleration $a_x$ which conforms to the following equation (5):

$$\left(\frac{F_x}{F_{x,max}}\right)^2 + \left(\frac{F_y}{F_{y,max}}\right)^2 = \left(\frac{ma_x}{ma_{x,max}}\right)^2 + \left(\frac{ma_y}{ma_{y,max}}\right)^2 = 1; \quad (4)$$

$$a_x = a_{x,max} \times \sqrt{1 - \left(\frac{a_y}{a_{y,max}}\right)^2}. \quad (5)$$

Finally, the kinematics calculating model includes a velocity V, an initial velocity $V_0$, the acceleration $\dot{V}$ and the time t, and conforms to the following equation (6). The processing unit generates the longitudinal velocity u and the lateral velocity v which conform to the following equation (7) according to the kinematics calculating model:

$$V = V_0 + \dot{V}t; \quad (6)$$

$$\begin{cases} u = \sqrt{u_0^2 + 2a_x S} \\ v = \sqrt{v_0^2 + 2a_y S} \end{cases}. \quad (7)$$

S is a distance, $u_0$ is an initial longitudinal velocity and $v_0$ is an initial lateral velocity. Therefore, the dynamic velocity planning method 100a for the autonomous vehicle HV of the present disclosure generates the lateral acceleration $a_y$ through the vehicle information 102 and the dynamics calculating model, and then generates the longitudinal acceleration $a_x$ through the friction circle calculating model, and finally generates the longitudinal velocity u and the lateral velocity v through the kinematics calculating model. It is worth noting that two accelerations $a_{HV}$ of the vehicle information 102 in a longitudinal direction X and a lateral direction Y during a future path are the abovementioned longitudinal acceleration $a_x$ and the lateral acceleration $a_y$, respectively. Two velocities $V_{HV}$ of the vehicle information 102 in the longitudinal direction X and the lateral direction Y are the abovementioned longitudinal velocity u and the lateral velocity v, respectively. The range of the accelerations $a_{HV}$ of the vehicle information 102 is the acceleration limit value range 104 of the autonomous vehicle HV.

The acceleration combination generating step S16 includes performing an acceleration interval generating step S162 and an acceleration dispersing step S164. The acceleration interval generating step S162 includes performing an obstacle limiting step S1622 and a road limiting step S1624.

The obstacle limiting step S1622 is performed to limit the acceleration limit value range 104 of the autonomous vehicle HV according to the obstacle information to generate an initial acceleration interval 104a. The road limiting step S1624 is performed to limit the initial acceleration interval 104a according to the road information to generate an acceleration interval 105. In detail, the processing unit limits the acceleration limit value range 104 based on the obstacle acceleration range 103 (i.e., the range of the obstacle acceleration $a_{Obj}$) of the obstacle information to generate the initial acceleration interval 104a. Then, the processing unit extracts the acceleration limit value range 104 based on the maximum speed limit $V_{max}$ and the minimum speed limit $V_{min}$ to generate the acceleration interval 105. Therefore, the dynamic velocity planning method 100a for the autonomous vehicle HV of the present disclosure uses the road information and the obstacle information in a general vehicle lane to further limit the acceleration limit value range 104 of the autonomous vehicle HV to calculate the applicable acceleration range of the autonomous vehicle HV (i.e., the acceleration interval 105).

Further, the acceleration dispersing step S164 includes performing a dispersing step S1642 and a target point combining step S1644. The dispersing step S1642 is performed to generate a plurality of acceleration groups G1, G2, G3, G4 according to a predetermined time interval and the acceleration interval 105, and disperse each of the acceleration groups G1, G2, G3, G4 according to a predetermined acceleration interval to generate at least one acceleration target point $a_T$. The target point combining step S1644 is performed to sequentially combine the at least one acceleration target point $a_T$ of each of the acceleration groups G1, G2, G3, G4 to generate a plurality of acceleration combinations 106. For example, when the predetermined acceleration interval is 1 m/s² and the predetermined time interval is 0.1 second as a standard, the acceleration interval 105 of a first trajectory point of the autonomous vehicle HV is [1,1] m/s² and only has an acceleration value (i.e., the acceleration target point $a_T$). Then, the next trajectory point of an acceleration value is calculated according to the first trajectory point, and the next acceleration interval 105 is [−3,5] m/s², which can divide into 9 kinds of acceleration values −3, −2, −1, 0, 1, 2, 3, 4 and 5 m/s². Similarly, the another trajectory point of an acceleration value is calculated according to the current trajectory point, and the another acceleration interval 105 is [−4,8] m/s², and so on (as shown in FIG. 7), and will not be detailedly described, but is not limited to the present disclosure.

The acceleration filtering step S18 is performed to drive the processing unit to filter the acceleration combinations 106 according to the jerk threshold and the jerk switching frequency threshold to obtain a selected acceleration combination 108. Specifically, each of the abovementioned acceleration combinations 106 includes a maximum jerk. The maximum jerk of each of the acceleration combinations 106 is less than or equal to the jerk threshold. The maximum jerk of each of the acceleration combinations 106 is represented as $J_{max}$. The jerk threshold is represented as $J_{threshold}$ and conforms to the following equation (8):

$$J_{max} \leq J_{threshold} \quad (8).$$

In detail, the acceleration combinations 106 include an acceleration combination 1061 and an acceleration combination 1062. The jerk threshold $J_{threshold}$ can be 20 m/s³. In the acceleration combination 1061, the first jerk about 10 m/s³ is generated from 1 m/s² to 2 m/s², and the final jerk (that is, the maximum jerk $J_{max}$ of the acceleration combination 1061) about 20 m/s³ is generated from 3 m/s² to 1 m/s². In the acceleration combination 1062, the first jerk (that is, the maximum jerk $J_{max}$ of the acceleration combination 1062) about 40 m/s³ is generated from 1 m/s² to −3 m/s², and the final jerk about 20 m/s³ is generated from 1 m/s² to −1 m/s². Therefore, the processing unit eliminates the abovementioned acceleration combination 1062 according to the jerk threshold $J_{threshold}$.

Moreover, the vehicle information 102 further includes the jerk switching frequency threshold which stores in the memory. Each of the abovementioned acceleration combinations 106 further includes a jerk switching frequency. Especially, the jerk switching frequency of each of the abovementioned acceleration combinations 106 is less than or equal to the jerk switching frequency threshold and represented as Jfrequency, and the jerk switching frequency threshold is represented as $f_{threshold}$ and conforms to the following equation (9):

$$\Sigma Jfrequency \leq f_{threshold} \quad (9).$$

In detail, the jerk switching frequency threshold $f_{threshold}$ can be 2. When the jerk is switched between positive and negative values, the jerk switching frequency Jfrequency is accumulated once time. In the acceleration combination 1061, the acceleration target point $a_T$ changes from the beginning 1 m/s² to 2 m/s². Next, the acceleration target point $a_T$ changes from 2 m/s² to 3 m/s², and then changes from 3 m/s² to 1 m/s². The jerk switching frequency Jfrequency of the acceleration combination 1061 is 0. In the acceleration combination 1062, the acceleration target point $a_T$ changes from the beginning 1 m/s² to −3 m/s². Next, the acceleration target point $a_T$ changes from −3 m/s² to 1 m/s², and then changes from 1 m/s² to −1 m/s². The jerk switching frequency Jfrequency of the acceleration combination 1062 is 3. Hence, the processing unit eliminates the abovementioned acceleration combination 1062 according to the jerk switching frequency threshold $f_{threshold}$. Therefore, the dynamic velocity planning method 100a for the autonomous vehicle HV of the present disclosure filters the acceleration combinations 106 of the vehicle dynamics through the jerk threshold $J_{threshold}$ and the jerk switching frequency threshold $f_{threshold}$ so as to generate the selected acceleration combination 108 (i.e., the acceleration combination 1061).

The acceleration smoothing step S20 is performed to drive the processing unit to execute the driving behavior procedure to adjust the selected acceleration combination 108 to generate the best velocity curve 110. The driving behavior procedure is classified into the progressive model M1, the normal model M2 and the conservative model M3 according to an acceleration a, a velocity V and a steering wheel angle θ In addition, the acceleration smoothing step S20 includes an adjusting step S202 and a fitting step S204. The adjusting step S202 is performed to adjust the selected acceleration combination 108 according to one of the abovementioned progressive model M1, the normal model M2 and the conservative model M3 to generate an artificial acceleration combination 108a. The artificial acceleration combination 108a has a plurality of optimal accelerations $a_{f1}$, $a_{f2}$, $a_{f3}$, $a_{f4}$. The fitting step S204 is performed to integrate and smooth each of the optimal accelerations $a_{f1}$, $a_{f2}$, $a_{f3}$, $a_{f4}$ of the artificial acceleration combination 108a to fit the best velocity curve 110.

In detail, each of the progressive model M1, the normal model M2 and the conservative model M3 includes a trend curve C. The processing unit adjusts the acceleration target points $a_{T1}$, $a_{T2}$, $a_{T3}$, $a_{T4}$ in the selected acceleration combination 108 to the optimal accelerations $a_{f1}$, $a_{f2}$, $a_{f3}$, $a_{f4}$ according to the trend curve C of one of the progressive model M1, the normal model M2 and the conservative model M3 which is similar to the selected acceleration combination 108, respectively. For example, the acceleration target point $a_{T2}$ (−3 m/s$^2$) is adjusted to the best acceleration $a_{f2}$ (−2 m/s$^2$). Finally, the artificial acceleration combination 108a is converted to a velocity combination 108b through an integration method. The velocity combination 108b is curve-fitted so as to smooth the velocity combination 108b and generate the best velocity curve 110. The controlling step S22 is performed to control the autonomous vehicle HV by an automatic driving parameter based on the best velocity curve 110. The detail of the controlling step S22 is the conventional technology, and will not be described again herein.

Therefore, the dynamic velocity planning method 100a for the autonomous vehicle HV of the present disclosure changes an acceleration changing rate through the driving behavior procedure so as to obtain the artificial acceleration combination 108a, and then fits the velocity combination 108b into a smooth curve to solve the controlling shock caused by the problems of a discontinuous velocity. The collision time between the autonomous vehicle HV and the obstacle Obj can be further estimated according to the best velocity curve 110, so that the interaction relationship between the autonomous vehicle HV and the obstacle Obj can be predicted.

Figure 12:
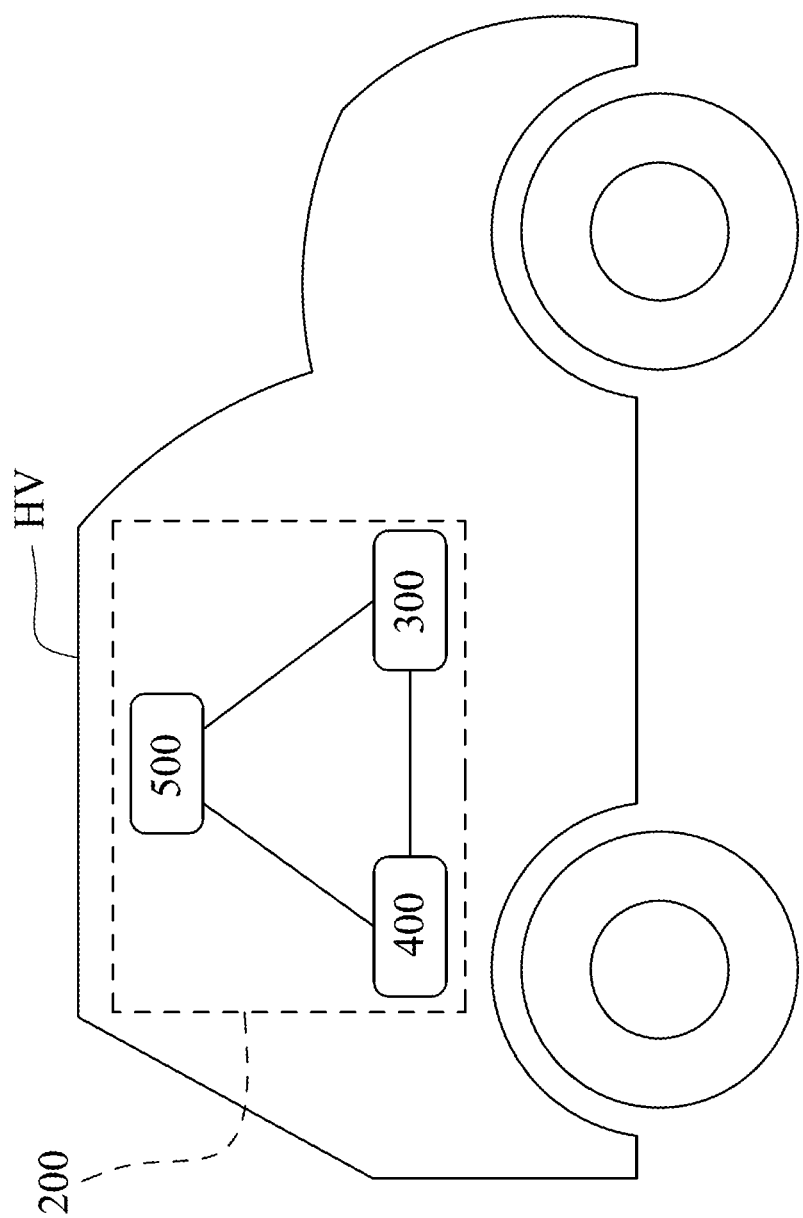
FIG. 12 shows a block diagram of a dynamic velocity planning system for an autonomous vehicle according to a third embodiment of the present disclosure.

Please refer to FIGS. 2 to 12. FIG. 12 shows a block diagram of a dynamic velocity planning system 200 for the autonomous vehicle HV according to a third embodiment of the present disclosure. The dynamic velocity planning system 200 for the autonomous vehicle HV is configured to plan the best velocity curve 110 of the autonomous vehicle HV and includes a sensing module 300, a memory 400 and a processing unit 500.

The sensing module 300 is configured to sense the obstacle information, the road information and the vehicle information 102 and store the obstacle information, the road information and the vehicle information 102 into the memory 400. The obstacle information includes the obstacle velocity $V_{Obj}$, the obstacle acceleration $a_{Obj}$. The road information includes the maximum speed limit $V_{max}$ and the minimum speed limit $V_{min}$. The vehicle information 102 includes the jerk threshold, the jerk switching frequency threshold, the front wheel cornering stiffness, the rear wheel cornering stiffness, the front wheelbase, the rear wheelbase, the vehicle inertia and the vehicle mass of the autonomous vehicle HV. The abovementioned sensing module 300 may include a GPS, a gyroscope, an odometer, a speed meter, an Inertial Measurement Unit (IMU), a LiDAR, a radar and a camera. The sensing module 300 is the conventional technology, and will not be described again herein.

The memory 400 is configured to access the obstacle information of the obstacle Obj, the vehicle information 102 of the autonomous vehicle HV, the calculating procedure and the driving behavior procedure. The driving behavior procedure is classified into the progressive model M1, the normal model M2 and the conservative model M3 according to the acceleration a, the velocity V and the steering wheel angle θ. The vehicle information 102 includes the jerk threshold $J_{threshold}$ and the jerk switching frequency threshold $f_{threshold}$ of the autonomous vehicle HV.

The processing unit 500 is electrically connected to the memory 400 and the sensing module 300. The processing unit 500 is configured to implement the dynamic velocity planning methods 100, 100a for the autonomous vehicle HV. The processing unit 500 may be a microprocessor, an electronic control unit (ECU), a computer, a mobile device or other computing processors.

Therefore, the dynamic velocity planning system 200 for the autonomous vehicle HV of the present disclosure uses the obstacle information, the road information and the vehicle information 102 to plan the acceleration combinations 106 feasible for the autonomous vehicle HV, and filter the acceleration combinations 106 to the artificial acceleration combination 108a suitable for driving behavior through the jerk limits so as to adapt to environmental changes in the future and improve the comfort of passengers.

In summary, the present disclosure has the following advantages: First, the acceleration limit value range is obtained through the vehicle information and the calculating procedure, and the acceleration combination is planned by integrating the obstacle information with the road information. The acceleration is used as a standard, and the present disclosure considers the vehicle operating limits, the vehicle dynamics and the human driving behavior at the same time so as to adapt to changes in the environmental. Second, the feasible acceleration combinations are filtered through the jerk threshold and the jerk switching frequency threshold so as to reduce the acceleration changing rate and improve the comfort of passengers. Third, the velocity planning that can cope with changes in the environment can handle situations that cannot be handled by ordinary commercially vehicle systems, such as obstacle intrusion, a lane change pace, etc. The present disclosure makes an autonomous vehicle planning system more robust and safer to environmental changes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dynamic velocity planning method for an autonomous vehicle, which is performed to plan a best velocity curve of the autonomous vehicle, and the dynamic velocity planning method for the autonomous vehicle comprising:
   performing an information storing step to drive a memory to store an obstacle information of an obstacle, a road information and a vehicle information of the autonomous vehicle, wherein the vehicle information comprises a jerk threshold and a jerk switching frequency threshold;
   performing an acceleration limit calculating step to drive a processing unit to receive the vehicle information from the memory and calculate the vehicle information according to a calculating procedure to generate an acceleration limit value range of the autonomous vehicle;
   performing an acceleration combination generating step to drive the processing unit to receive the obstacle information and the road information from the memory and plan an acceleration interval of the autonomous vehicle according to the obstacle information, the road information and the acceleration limit value range, and then generate a plurality of acceleration combinations of the autonomous vehicle according to the acceleration interval;

performing an acceleration filtering step to drive the processing unit to filter the acceleration combinations according to the jerk threshold and the jerk switching frequency threshold to obtain a selected acceleration combination; and performing an acceleration smoothing step to drive the processing unit to execute a driving behavior procedure to adjust the selected acceleration combination to generate the best velocity curve;

wherein the vehicle information further comprises a front wheel cornering stiffness, a rear wheel cornering stiffness, a front wheelbase, a rear wheelbase, a vehicle inertia and a vehicle mass.

2. The dynamic velocity planning method for the autonomous vehicle of claim 1, wherein the acceleration limit calculating step comprises:

performing a lateral acceleration calculating step to drive the processing unit to calculate the vehicle information according to a dynamics calculating model to generate a lateral acceleration of the autonomous vehicle;

performing a longitudinal acceleration calculating step to drive the processing unit to calculate the lateral acceleration according to a friction circle calculating model to generate a longitudinal acceleration of the autonomous vehicle; and performing a longitudinal-velocity and lateral-velocity calculating step to drive the processing unit to calculate the lateral acceleration and the longitudinal acceleration according to a kinematics calculating model to generate a lateral velocity and a longitudinal velocity of the autonomous vehicle, respectively.

3. The dynamic velocity planning method for the autonomous vehicle of claim 1, wherein the acceleration combination generating step comprises:

performing an acceleration interval generating step, wherein the acceleration interval generating step is implemented by the processing unit and comprises:

performing an obstacle limiting step to limit the acceleration limit value range of the autonomous vehicle according to the obstacle information to generate an initial acceleration interval; and performing a road limiting step to limit the initial acceleration interval according to the road information to generate the acceleration interval.

4. The dynamic velocity planning method for the autonomous vehicle of claim 3, wherein the acceleration combination generating step further comprises:

performing an acceleration dispersing step, wherein the acceleration dispersing step is implemented by the processing unit and comprises:

performing a dispersing step to generate a plurality of acceleration groups according to a predetermined time interval and the acceleration interval and disperse each of the acceleration groups according to a predetermined acceleration interval to generate at least one acceleration target point; and performing a target point combining step to sequentially combine the at least one acceleration target point of each of the acceleration groups to generate the acceleration combinations.

5. The dynamic velocity planning method for the autonomous vehicle of claim 1, wherein each of the acceleration combinations comprises a maximum jerk and a jerk switching frequency, the jerk threshold is represented as $J_{threshold}$, the maximum jerk of each of the acceleration combinations is represented as $J_{max}$, the jerk switching frequency of each of the acceleration combinations is represented as Jfrequency, and the jerk switching frequency threshold is represented as $f_{threshold}$ and conforms to the following equation:

$$J_{max} \leq J_{threshold};\text{ and}$$

$$\text{EJfrequency} \leq f_{threshold}.$$

6. The dynamic velocity planning method for the autonomous vehicle of claim 1, wherein the acceleration smoothing step comprises:

performing an adjusting step to adjust the selected acceleration combination according to one of a progressive model, a normal model and a conservative model to generate an artificial acceleration combination, wherein the artificial acceleration combination has a plurality of optimal accelerations; and performing a fitting step to integrate and smooth the optimal accelerations of the artificial acceleration combination to fit the best velocity curve.

7. A dynamic velocity planning system for an autonomous vehicle, which is performed to plan a best velocity curve of the autonomous vehicle, and the dynamic velocity planning system for the autonomous vehicle comprising:

a memory configured to access an obstacle information of an obstacle, a road information, a vehicle information of the autonomous vehicle, a calculating procedure and a driving behavior procedure, wherein the vehicle information comprises a jerk threshold and a jerk switching frequency threshold; and a processing unit electrically connected to the memory, wherein the processing unit is configured to implement a dynamic velocity planning method for the autonomous vehicle comprising:

performing an acceleration limit calculating step to calculate the vehicle information according to the calculating procedure to generate an acceleration limit value range of the autonomous vehicle;

performing an acceleration combination generating step to plan an acceleration interval of the autonomous vehicle according to the obstacle information, the road information and the acceleration limit value range, and then generate a plurality of acceleration combinations of the autonomous vehicle according to the acceleration interval;

performing an acceleration filtering step to filter the acceleration combinations according to the jerk threshold and the jerk switching frequency threshold to obtain a selected acceleration combination; and performing an acceleration smoothing step to execute the driving behavior procedure to adjust the selected acceleration combination to generate the best velocity curve;

wherein the vehicle information further comprises a front wheel cornering stiffness, a rear wheel cornering stiffness, a front wheelbase, a rear wheelbase, a vehicle inertia and a vehicle mass.

8. The dynamic velocity planning system for the autonomous vehicle of claim 7, wherein the memory comprises a dynamics calculating model, a friction circle calculating model and a kinematics calculating model, and the acceleration limit calculating step comprises:

performing a lateral acceleration calculating step to calculate the vehicle information according to the dynamics calculating model to generate a lateral acceleration of the autonomous vehicle;

performing a longitudinal acceleration calculating step to calculate the lateral acceleration according to the friction circle calculating model to generate a longitudinal acceleration of the autonomous vehicle; and performing a longitudinal-velocity and lateral-velocity calculating step to calculate the lateral acceleration and the longitudinal acceleration according to the kinematics calculating model to generate a lateral velocity and a longitudinal velocity of the autonomous vehicle, respectively.

9. The dynamic velocity planning system for the autonomous vehicle of claim 7, wherein the processing unit is configured to implement an acceleration interval generating step, and the acceleration interval generating step comprises:

performing an obstacle limiting step to limit the acceleration limit value range of the autonomous vehicle according to the obstacle information to generate an initial acceleration interval; and performing a road limiting step to limit the initial acceleration interval according to the road information to generate the acceleration interval.

10. The dynamic velocity planning system for the autonomous vehicle of claim 9, wherein the processing unit is configured to implement an acceleration dispersing step, and the acceleration dispersing step comprises:

performing a dispersing step to generate a plurality of acceleration groups according to a predetermined time interval and the acceleration interval and disperse each of the acceleration groups according to a predetermined acceleration interval to generate at least one acceleration target point; and performing a target point combining step to sequentially combine the at least one acceleration target point of each of the acceleration groups to generate the acceleration combinations.

11. The dynamic velocity planning system for the autonomous vehicle of claim 7, wherein each of the acceleration combinations comprises a maximum jerk and a jerk switching frequency, the jerk threshold is represented as $J_{threshold}$, the maximum jerk of each of the acceleration combinations is represented as $J_{max}$, the jerk switching frequency of each of the acceleration combinations is represented as Jfrequency, and the jerk switching frequency threshold is represented as $f_{threshold}$ and conforms to the following equation:

$$J_{max} \leq J_{threshold}; \text{ and}$$

$$\text{EJfrequency} \leq f_{threshold}.$$

12. The dynamic velocity planning system for the autonomous vehicle of claim 7, wherein the processing unit is configured to implement the acceleration smoothing step, and the acceleration smoothing step comprises:

performing an adjusting step to adjust the selected acceleration combination according to one of a progressive model, a normal model and a conservative model to generate an artificial acceleration combination, wherein the artificial acceleration combination has a plurality of optimal accelerations; and performing a fitting step to integrate and smooth the optimal accelerations of the artificial acceleration combination to fit the best velocity curve.

* * * * *